Figure 1:
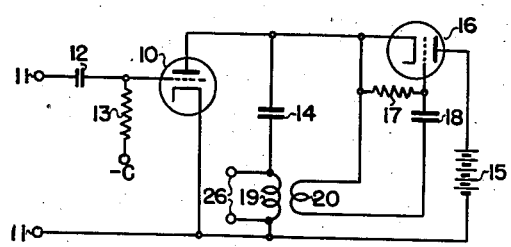

Nov. 12, 1940.  J. C. WILSON  2,221,666

PERIODIC WAVE REPEATER

Filed Jan. 20, 1940

Time ⟶

INVENTOR
JOHN C. WILSON
BY Laurence B. Dodds
ATTORNEY

Patented Nov. 12, 1940

2,221,666

UNITED STATES PATENT OFFICE 2,221,666

PERIODIC WAVE REPEATER

John C. Wilson, Bayside, N. Y., assignor to Hazeltine Corporation, a corporation of Delaware Application January 20, 1940, Serial No. 314,772

11 Claims. (Cl. 250—36)

This invention relates to periodic wave repeaters and particularly to such repeaters adapted to repeat only selected pulses of a periodic-pulse input wave.

In modulated-carrier television signal-translating systems periodic wave repeaters are now frequently used as submultiple-frequency generators and synchronizing-signal separators in the transmission and reception, respectively, of synchronizing signals. One form of periodic wave repeater previously proposed includes a condenser which is alternately charged from a direct current source and discharged, at least one of such changes in the condition of charge of the condenser being controlled by a vacuum tube. Such tube is adapted to be fired by selected pulses of a periodic-pulse wave applied to its control grid and, therefore, is usually incidentally subject to firing by spurious pulses. In a number of copending applications assigned to the same assignee as the present application, various proposals have been made to provide repeaters of this type which are substantially insensitive to undesired pulses or extraneous transients during the greater portion of the period of the periodic wave intervening between successive selected pulses; namely, applicant's application Serial No. 226,874, filed August 26, 1938; Patent No. 2,212,173 to Harold A. Wheeler and applicant; and Patent No. 2,212,420 to Daniel E. Harnett. However, there still exists the need for a more perfect periodic wave repeater that is entirely unresponsive to all pulses and transients applied to its input circuit during a predetermined portion of the period of the periodic wave to be repeated which may be adjusted to extend over the entire interval between selected pulses of such periodic wave.

It is an object of the invention, therefore, to provide an improved periodic wave repeater which is completely unresponsive to transients, to spurious pulses, and to all pulses other than selected pulses of a periodic-pulse wave applied to its input circuit.

It is a further object of the invention to provide an improved periodic wave repeater which is capable of generating pulses of adjustable duration and fixed period or of adjustable period and fixed duration, or both.

In accordance with the invention, a periodic wave repeater adapted to repeat only selected pulses of a periodic-pulse wave and which may be incidentally subjected to spurious pulses or transients, comprises an energy-storage device having charging and discharging circuits coupled thereto. One of such circuits includes a first repeater having an input circuit adapted to have applied thereto said periodic-pulse wave. There is also provided means for conditioning the first repeater for firing by pulses of the periodic-pulse wave only in response to a predetermined condition of charge of the energy-storage circuit. The other of such circuits includes a second repeater. There are also provided means for deriving from one of such circuits pulses resulting from a change in the condition of charge of the energy-storage circuit in one sense thereby and means including a delay circuit excited by the derived pulses to control the second repeater to render it conductive only after a predetermined time delay to change the condition of charge of the energy-storage device in an opposite sense, whereby the energy-storage device remains in such a condition of charge that the first repeater is entirely unresponsive to all pulses or transients applied to its input circuit during substantially the entire time of such delay.

In one preferred embodiment of the invention, the energy-storage device comprises a condenser adapted to be discharged by the firing of a first vacuum-tube repeater as a result of the application to its input circuit of a selected pulse of a periodic-pulse wave, subsequent charging of the condenser being effected by the firing of a second vacuum-tube repeater which is controlled by a pulse derived from the discharge of the condenser with a predetermined time delay. Thus, the improved periodic wave repeater of the invention, while of general application, is particularly suitable for use as a submultiple-frequency generator or as a synchronizing-signal separator, being not only wholly insensitive to unselected pulses in the periodic-pulse wave but also wholly insensitive to noise throughout substantially the entire period between selected pulses.

For a better understanding of the invention, together with other and further objects thereof, reference is had to the following description taken in connection with the accompanying drawing, and its scope will be pointed out in the appended claims.

Figure 2:
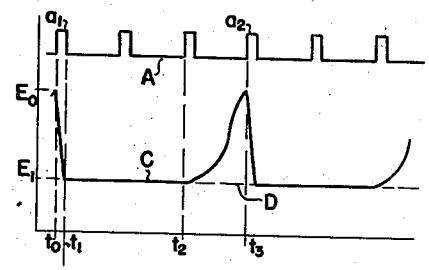
Figure 3:
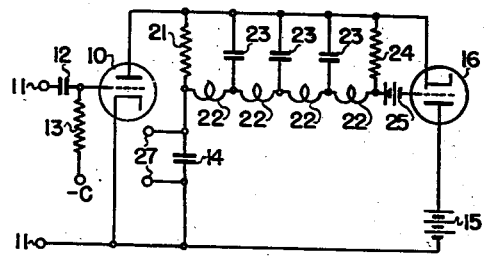
Figure 5:
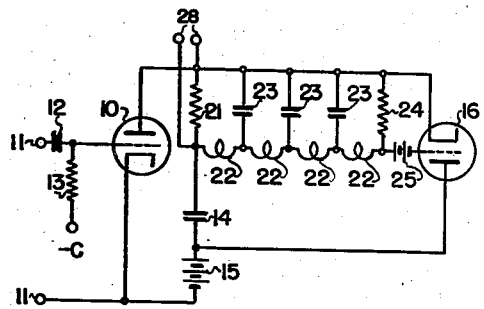

In the drawing, Figs. 1, 3, and 5 are simplified circuit diagrams of periodic wave repeaters embodying different forms of the invention; Fig. 2 is a graph illustrating certain operating characteristics of the circuit of Fig. 1; and Fig. 4 comprises graphs illustrating certain operating characteristics of the circuit of Fig. 3.

Referring now more particularly to the drawing, in Fig. 1 there is shown a periodic wave repeater comprising a vacuum tube 10, the input circuit of which includes terminals 11, 11, and a coupling condenser 12. Such input circuit is adapted to have applied thereto a periodic-pulse wave from any suitable source, the tube 10 having its input grid normally biased to cutoff by a source of voltage, indicated as −C, applied through a grid-leak resistor 13. The anode circuit of the tube 10 includes, and comprises a discharging circuit of, a condenser 14 the charging circuit of which comprises a source of unidirectional potential, such as battery 15, and the anode circuit of a second vacuum tube 16. The control circuit of tube 16 is coupled to a common portion of the charging and discharging circuits of condenser 14 by a delay circuit including a condenser 18 and grid-leak resistor 17 and a transformer 19, 20 having its primary winding 19 connected in series with condenser 14 and its secondary winding included in the delay circuit. An output circuit having terminals 26, 26 may be coupled across the transformer winding 19. The periodic wave repeater described is generally similar to those which have been previously used and its operation is well understood in the art. Briefly, however, condenser 14 is charged exponentially from battery 15 through vacuum tube 16 and is discharged by vacuum tube 10, this cycle being indefinitely repeated.

In considering the operation of the system described, it will be assumed that condenser 14 is initially charged to its normal value $E_0$ from battery 15 at the instant $t_0$, as indicated on curve C of Fig. 2. The wave A of Fig. 2 indicates a periodic-pulse wave applied to the input electrode of tube 10, each of the pulses being sufficient to bias the tube substantially above its cutoff value to render it conductive during the pulse interval if its anode is above a moderate value related to the grid bias −C and indicated by broken line D. Therefore, the first pulse $a_1$ of wave A is effective to render tube 10 conductive rapidly to discharge condenser 14 to the potential $E_1$ at which the tube 10 again becomes nonconductive.

The rapid discharge of condenser 14 also rapidly charges condenser 18 by way of transformer 19, 20 and the grid-cathode circuit of tube 16 to such a potential as to bias the control electrode of tube 16 negatively beyond cutoff, blocking the recharging of condenser 14 from battery 15. The charge on condenser 18 gradually leaks away through resistor 17, gradually reducing the negative bias on tube 16 through and above cutoff. The time constant of the delay circuit including resistor 17 and condenser 18 is chosen such that the cutoff bias is removed and the tube 16 begins to conduct at the time $t_2$ somewhat prior to the instant $t_3$ of arrival of the succeeding selected pulse $a_2$ so that the condenser 14 is substantially fully charged from the battery 15 to the potential $E_0$, as indicated by curve C of Fig. 2, and the tube 10 is conditioned for firing at the desired instant $t_3$ at which the succeeding selected pulse arrives, and the above-described cycle is repeated. Since the condenser 14 is only partially charged over almost the entire period of the oscillator and its potential does not rise substantially above the value D to a value at which the tube 10 becomes conductive until approximately the instant the succeeding selected pulse is due, the tube 10 is entirely unresponsive to all pulses or transients applied to its input circuit during nearly the entire interval between successive selected pulses; that is, during this interval, the condenser 14 is discharged to the maximum extent of which the tube 10 is capable of discharging it so that spurious pulses applied to the input circuit of tube 10 have no effect on the circuit.

Referring to Fig. 3 of the drawing, there is illustrated a periodic wave repeater comprising certain features of similarity with the circuit of Fig. 1, similar elements being denoted by similar reference numerals. A resistor 21 is included in the common portion of the charging and the discharging circuits of condenser 14 and is coupled to the input circuit of tube 16 by a pulse-delaying network comprising series-inductance elements 22, shunt-capacitance elements 23 and a terminating resistor 24. A bias source, such as a battery 25, is included in the control circuit of the tube 16 normally to bias its control electrode to cutoff. An output circuit having terminals 27, 27 may be coupled across the condenser 14.

Figure 4:
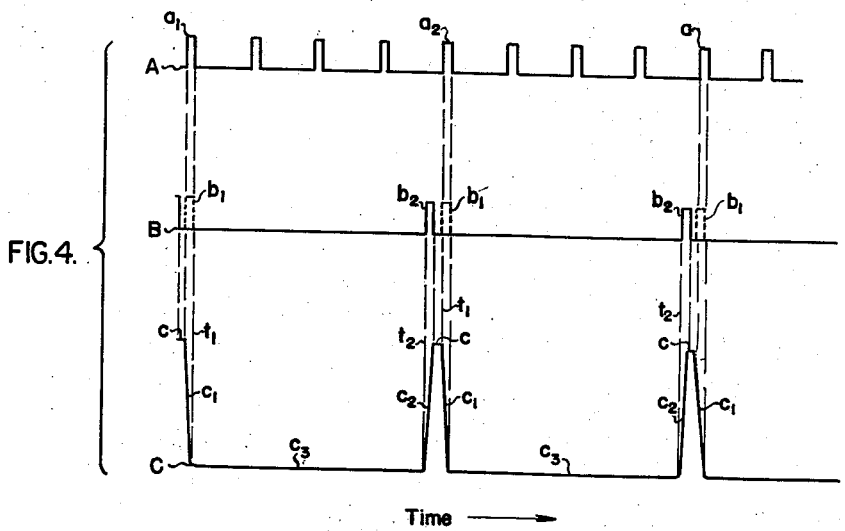

In considering the operation of the periodic wave repeater of Fig. 3, it will be assumed that the condenser 14 is initially charged to a potential $c$ on the voltage-time characteristic of condenser 14 as represented by curve C of Fig. 4. A selected pulse $a_1$ of the periodic-pulse wave A applied to the input circuit of tube 10 fires the latter, rapidly discharging the condenser 14, as indicated by portion $c_1$ of curve C. As a result, the resistor 21 derives a pulse $b_1$, curve B, from the discharging current of condenser 14, which is translated during time $t_1$—$t_2$ by the delay network 22, 23 and is applied as pulse $b_2$ to the control electrode of tube 16, biasing the latter above cutoff and firing it. The tube 16 then effects a rapid charging of the condenser 14 from battery 15 to the potential $c$, as indicated by portion $c_2$ of curve C. During the interval of time $t_1$—$t_2$ required for a pulse derived from a selected pulse to be translated by the network 22, 23 from the output circuit of tube 10 to the input circuit of tube 16, the condenser 14 is substantially completely discharged, as indicated by portion $c_3$ of curve C, so that the anode voltage of tube 10 is so low that it is entirely insensitive to all pulses or transients applied to its input circuit during such interval.

The period of the pulses of curve C may be changed by adjusting the time delay $t_1$—$t_2$ required for a discharge pulse $b_1$—$b_2$ to be translated by the delay network 22, 23 from the output circuit of tube 10 to the input circuit of tube 16, as by adjusting the values of the elements 22, 23 of the delay network, or the number of such elements, or both. Changing the number of elements alters the time delay while keeping the fidelity the same; changing the values in general alters both the time delay and the fidelity. The selected period must necessarily be an integral multiple of the period of the periodic input wave. The duration of the pulses may be changed by adjusting the values of the time constants of the charging and discharging circuits of condenser 14, but these time constants should be chosen as short as possible, resulting in pulses as narrow as possible, if it is desired to increase to a maximum the portion of the period during which the circuit is insensitive to spurious pulses and transients. While both of the resistors 21 and 24 may serve properly to terminate the delay network 22, 23 to prevent reflection of the transmitted pulses from either terminal, it is, in general, preferable to make the value of resistor 21 much lower than that of resistor 24 in order to reduce the effective charging and discharging time constant.

Referring to Fig. 5, there is shown an alternative circuit similar to that of Fig. 3 except that the battery 15 is connected in the anode circuit of the first repeater 10 for charging the condenser 14 when the repeater 10 is rendered conductive in response to a selected pulse, the condenser being subsequently discharged when the tube 16 is rendered conductive after a predetermined time delay during which the condenser 14 remains charged. An output circuit having terminals 28, 28 may be coupled across the resistor 21.

In considering the operation of the periodic wave repeater illustrated in Fig. 5, it will be assumed that the condenser 14 is initially discharged. Thus, a selected pulse applied to its input circuit renders the tube 10 conductive so that the battery 15 rapidly charges the condenser 14 and causes a pulse to be derived by resistor 21 and to travel, with a predetermined time delay, through the delay circuit 22, 23. During the whole of such time delay the condenser 14 consequently remains completely charged and the tube 10 is entirely unresponsive to all pulses and transients applied to its input circuit which tend only to continue the charging of condenser 14. However, the instant the derived pulse exciting the delay circuit reaches the control circuit of tube 16, the latter is rendered conductive rapidly to discharge the condenser 14, and the cycle is repeated.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A periodic wave repeater adapted to repeat only selected pulses of a periodic-pulse wave and which may be incidentally subjected to spurious pulses or transients comprising, an energy-storage device having charging and discharging circuits coupled thereto, one of said circuits including a first repeater having an input circuit adapted to have applied thereto said periodic-pulse wave, means for conditioning said first repeater for firing by pulses of said periodic-pulse wave only in response to a predetermined condition of charge of said energy-storage device, the other of said circuits including a second repeater, means for deriving from said one of said circuits pulses resulting from a change in the condition of charge of said energy-storage device in one sense thereby, and means including a delay circuit excited by said derived pulses to control said second repeater to render it conductive only after a predetermined time delay to change the condition of charge of said energy-storage device in an opposite sense, whereby said energy-storage device remains in such a condition of charge that said first repeater is entirely unresponsive to all pulses or transients applied to its input circuit during substantially the entire time of said delay.

2. A periodic wave repeater adapted to repeat only selected pulses of a periodic-pulse wave and which may be incidentally subjected to spurious pulses or transients comprising, an energy-storage device having charging and discharging circuits coupled thereto, said discharging circuit including a first repeater having an input circuit adapted to have applied thereto said periodic-pulse wave, means for conditioning said first repeater for firing by pulses of said periodic-pulse wave only in response to a predetermined condition of charge of said energy-storage device, said charging circuit including a second repeater, means for deriving from one of said circuits pulses resulting from the discharging of said energy-storage device, and means including a delay circuit excited by said derived pulses to control said second repeater to render it conductive only after a predetermined time delay to charge said energy-storage device, whereby said energy-storage device remains in such a condition of charge that said first repeater is entirely unresponsive to all pulses or transients applied to its input circuit during substantially the entire time of said delay.

3. A periodic wave repeater adapted to repeat only selected pulses of a periodic-pulse wave and which may be incidentally subjected to spurious pulses or transients comprising, an energy-storage device having charging and discharging circuits coupled thereto, said charging circuit including a first repeater having an input circuit adapted to have applied thereto said periodic-pulse wave, means for conditioning said first repeater for firing by pulses of said periodic-pulse wave only in response to a predetermined condition of charge of said energy-storage device, said discharging circuit including a second repeater, means for deriving from said charging circuit pulses resulting from the charging of said energy-storage device, and means including a delay circuit excited by said derived pulses to control said second repeater to render it conductive only after a predetermined time delay to discharge said energy-storage device, whereby said energy-storage device remains in such a condition of charge that said first repeater is entirely unresponsive to all pulses or transients applied to its input circuit during substantially the entire time of said delay.

4. A periodic wave repeater adapted to repeat only selected pulses of a periodic-pulse wave and which may be incidentally subjected to spurious pulses or transients comprising, an energy-storage device having charging and discharging circuits coupled thereto, one of said circuits including a first repeater having an input circuit adapted to have applied thereto said periodic-pulse wave, means for conditioning said first repeater for firing by pulses of said periodic-pulse wave only in response to a predetermined condition of charge of said energy-storage device, the other of said circuits including a second repeater, impedance means in series with said energy-storage device for deriving from said one of said circuits pulses resulting from a change in the condition of charge of said energy-storage device in one sense thereby, and means including a delay circuit excited by said derived pulses to control said second repeater to render it conductive only after a predetermined time delay to change the condition of charge of said energy-storage device in an opposite sense, whereby said energy-storage device remains in such a condition of charge that said first repeater is entirely unresponsive to all pulses or transients applied to its input circuit during substantially the entire time of said delay.

5. A periodic wave repeater adapted to repeat only selected pulses of a periodic-pulse wave and which may be incidentally subjected to spurious pulses or transients comprising, an energy-storage device having charging and discharging circuits coupled thereto, one of said circuits including a first repeater having an input circuit adapted to have applied thereto said periodic-pulse wave, means for conditioning said first repeater for firing by pulses of said periodic-pulse wave only in response to a predetermined condition of charge of said energy-storage device, the other of said circuits including a second repeater, transformer means including a winding in series with said energy-storage device for deriving from said one of said circuits pulses resulting from a change in the condition of charge of said energy-storage circuit in one sense thereby, and means including a delay circuit excited by said derived pulses to control said second repeater to render it conductive only after a predetermined time delay to change the condition of charge of said energy-storage device in an opposite sense, whereby said energy-storage device remains in such a condition of charge that said first repeater is entirely unresponsive to all pulses or transients applied to its input circuit during substantially the entire time of said delay.

6. A periodic wave repeater adapted to repeat only selected pulses of a periodic-pulse wave and which may be incidentally subjected to spurious pulses or transients comprising, an energy-storage device having charging and discharging circuits coupled thereto, one of said circuits including a first repeater having an input circuit adapted to have applied thereto said periodic-pulse wave, means for conditioning said first repeater for firing by pulses of said periodic-pulse wave only in response to a predetermined condition of charge of said energy-storage device, the other of said circuits including a second repeater, a resistor in series with said energy-storage device for deriving from said one of said circuits pulses resulting from a change in the condition of charge of said energy-storage device in one sense thereby, and means including a delay circuit excited by said derived pulses to control said second repeater to render it conductive only after a predetermined time to change the condition of charge of said energy-storage device in an opposite sense, whereby said energy-storage device remains in such a condition of charge that said first repeater is entirely unresponsive to all pulses or transients applied to its input circuit during substantially the entire time of said delay.

7. A periodic wave repeater adapted to repeat only selected pulses of a periodic-pulse wave and which may be incidentally subjected to spurious pulses or transients comprising, a condenser having charging and discharging circuits coupled thereto, one of said circuits including a first vacuum-tube repeater having an input circuit adapted to have applied thereto said periodic-pulse wave, means for conditioning said first vacuum-tube repeater for firing by pulses of said periodic-pulse wave only in response to a predetermined condition of charge of said condenser, the other of said circuits including a second vacuum-tube repeater, means for deriving from said one of said circuits pulses resulting from a change in the condition of charge of said condenser in one sense thereby, and means including a delay circuit excited by said derived pulses to control said second repeater to render it conductive only after a predetermined time delay to change the condition of charge of said condenser in an opposite sense, whereby said condenser remains in such a condition of charge that said first vacuum-tube repeater is entirely unresponsive to all pulses or transients applied to its input circuit during substantially the entire time of said delay.

8. A periodic wave repeater adapted to repeat only selected pulses of a periodic-pulse wave and which may be incidentally subjected to spurious pulses or transients comprising, a condenser, a first vacuum tube having an anode circuit coupled to said condenser and an input circuit adapted to have applied thereto said periodic-pulse wave, said vacuum tube when conductive being effective to change in one sense the condition of charge of said condenser, a circuit for changing in the opposite sense the condition of charge of said condenser including a second vacuum tube having a control electrode, means responsive to a change in one sense in the condition of charge of said condenser to control changing in the opposite sense the condition of charge thereof including a delay network coupling said anode circuit to said control electrode and having a predetermined time delay, and means for biasing said control electrode substantially to cut-off during the period of delay of said network, whereby said condenser remains in substantially a constant condition of charge until the expiration of said time delay.

9. A periodic wave repeater adapted to repeat only selected pulses of a periodic-pulse wave and which may be incidentally subject to spurious pulses or transients comprising, a condenser, a first vacuum tube having an anode circuit coupled to said condenser and an input circuit adapted to have applied thereto said periodic-pulse wave, said vacuum tube being effective when conductive to discharge said condenser only when the latter is substantially charged, a charging circuit for said condenser including a second vacuum tube having a control electrode normally biased so as to render said second tube conductive, means responsive to discharging of said condenser to control subsequent charging thereof including a delay network coupling said anode circuit to said control electrode and having a predetermined time delay, and means responsive to the condition of charge of said delay network for biasing said control electrode to a value such that said tube is nonconductive during the period of delay of said network, whereby said condenser remains substantially discharged until the expiration of said time delay.

10. A periodic wave repeater adapted to repeat only selected pulses of a periodic-pulse wave and which may be incidentally subject to spurious pulses or transients comprising, a condenser, a first vacuum tube having an anode circuit coupled to said condenser and an input circuit adapted to have applied thereto said periodic-pulse wave, said vacuum tube being effective when conductive to discharge said condenser only when the latter is substantially charged, a charging circuit for said condenser including a second vacuum tube having a control electrode, means responsive to discharging of said condenser to control subsequent charging thereof including a delay network coupling said anode circuit to said control electrode having a predetermined time delay, and means for biasing said control electrode substantially to cutoff during the period of delay of the network, whereby said condenser remains substantially discharged until said control electrode is biased in response to the discharging of said condenser to a value such that said second tube is rendered conductive.

11. A periodic wave repeater adapted to repeat only selected pulses of a periodic-pulse wave and which may be incidentally subject to spurious pulses or transients comprising, a condenser, a first vacuum tube having an anode circuit coupled to said condenser and an input circuit adapted to have applied thereto said periodic-pulse wave, said vacuum tube being effective when conductive to charge said condenser only when the latter is substantially discharged, a discharging circuit for said condenser including a second vacuum tube having a control electrode, means responsive to charging of said condenser to control subsequent discharging thereof including a delay network coupling said anode circuit to said control electrode and having a predetermined time delay, and means for biasing said control electrode substantially to cutoff during the period of delay of said network, whereby said condenser remains substantially charged until said control electrode is biased in response to the charging of said condenser to a value such that said second tube is rendered conductive.

JOHN C. WILSON.